United States Patent
Mizugaki et al.

(10) Patent No.: US 7,321,575 B2
(45) Date of Patent: Jan. 22, 2008

(54) NODE POSITION MEASURING SYSTEM

(75) Inventors: Kenichi Mizugaki, Kokubunji (JP);
Ryosuke Fujiwara, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 11/293,215

(22) Filed: Dec. 5, 2005

(65) Prior Publication Data

US 2006/0133271 A1 Jun. 22, 2006

(30) Foreign Application Priority Data

Dec. 17, 2004 (JP) .............................. 2004-365939

(51) Int. Cl.
*H04Q 7/00* (2006.01)

(52) U.S. Cl. ...................... 370/328; 370/338; 370/342; 370/222; 370/401; 455/456.1; 455/404.2; 455/67.11; 455/67.13; 342/357.01; 342/463

(58) Field of Classification Search ................ 370/328, 370/342, 400, 401, 222; 455/67.11, 67.13; 342/457, 357.01, 357.17, 463

See application file for complete search history.

(56) References Cited

U.S. PATENT DOCUMENTS

| | | | | |
|---|---|---|---|---|
| 5,293,645 | A * | 3/1994 | Sood | 455/456.2 |
| 5,613,205 | A * | 3/1997 | Dufour | 455/440 |
| 5,717,689 | A * | 2/1998 | Ayanoglu | 370/349 |
| 5,960,355 | A * | 9/1999 | Ekman et al. | 455/456.1 |
| 6,246,884 | B1 * | 6/2001 | Karmi et al. | 455/521 |
| 6,342,854 | B1 * | 1/2002 | Duffett-Smith et al. | 342/457 |
| 6,476,762 | B2 * | 11/2002 | Valio et al. | 342/357.02 |
| 6,519,464 | B1 * | 2/2003 | Santhoff et al. | 455/456.5 |

(Continued)

FOREIGN PATENT DOCUMENTS

GB 2 330 716 A 10/1997

(Continued)

OTHER PUBLICATIONS

A. Ogino et al., "Integrated Wireless LAN Access System: Study on Location System", General Conference 2003, The Institute of Electronics, Information and Communication Engineers p. 662 in Japanese, pp. 1-5, English translation.

(Continued)

*Primary Examiner*—M. Milord
(74) *Attorney, Agent, or Firm*—Reed Smith LLP; Stanley P. Fisher, Esq.; Juan Carlos A. Marquez, Esq.

(57) ABSTRACT

A node position measuring system according to this invention includes a node, a reference station, base stations, a server that calculates a position of the node, and a network. The reference station includes a positioning signal reception module and a reference signal generation module that transmits a reference signal after the positioning signal reception module receives the positioning signal. Each of the base stations includes a signal reception module, a reception time measuring module that detects specific patterns from the positioning signal and the reference signal received by the signal reception module to measure a detection time, and a communication module that transmits time information, which is generated from the time measured by the reception time measuring module, to the server. The server includes a position calculation module that calculates the position of the node based on the time information transmitted from the base station.

14 Claims, 12 Drawing Sheets

U.S. PATENT DOCUMENTS

| | | |
|---|---|---|
| 6,618,005 B2 * | 9/2003 | Hannah et al. .......... 342/357.1 |
| 6,671,495 B1 * | 12/2003 | Lappetelainen et al. .. 455/67.11 |
| 6,845,239 B1 * | 1/2005 | Sato et al. .............. 455/456.1 |
| 6,972,718 B2 * | 12/2005 | Watanabe et al. ........... 342/387 |
| 7,139,583 B2 * | 11/2006 | Yamasaki et al. ........ 455/456.1 |
| 7,167,715 B2 * | 1/2007 | Stanforth .................... 455/457 |
| 7,221,928 B2 * | 5/2007 | Laird et al. .............. 455/404.1 |
| 2001/0044311 A1 | 11/2001 | Larsson et al. |
| 2003/0069025 A1 | 4/2003 | Hoctor et al. |
| 2004/0108954 A1 | 6/2004 | Richley et al. |
| 2005/0130669 A1 | 6/2005 | Mizugaki et al. |

FOREIGN PATENT DOCUMENTS

| | | |
|---|---|---|
| JP | 07-181242 | 12/1993 |
| JP | 2003-189353 | 10/2002 |
| JP | 2005-140617 | 11/2003 |

OTHER PUBLICATIONS

European Search Report dated Mar. 13, 2006.

* cited by examiner

NODE POSITION MEASURING SYSTEM

CLAIM OF PRIORITY

The present application claims priority from Japanese patent application P2004-365939 filed on Dec. 17, 2005, the content of which is hereby incorporated by reference into this application.

BACKGROUND OF THE INVENTION

This invention relates to a position measuring method for measuring a position of a node having a radio transmitting function, a node position measuring system using the method, and an access point (AP) used as a base station in the node position measuring system.

As a representative conventional node position measuring method, there has been available a method of measuring a position by using a signal from a satellite such as a GPS.

As another node position measuring method, there has been available a method of receiving signals sent from several base stations by a node and calculating a position of the node based on a reception timing difference of the signals.

Specifically, regarding a cellular telephone system, there has been proposed a method of calculating reception timing differences of signals sent from base stations to a mobile terminal (propagation time differences T1–T2 and T3–T2 of signals from the base stations to the mobile terminal), multiplying the propagation time differences by a light velocity, to calculate propagation distance differences of signals from the mobile terminal to the base stations, which is expressed by the following equations:

$$D1-D2=c(T1-T2); \text{ and}$$

$$D3-D2=c(T3-T2),$$

to thereby calculate a position of the moving terminal (for example, refer to JP 07-181242 A).

Furthermore, regarding a radio LAN system, there has been proposed a method of calculating a reception timing difference of signals sent from a node and received by base stations (reception timing difference Ti–T1 between the base stations), multiplying the reception timing difference by a light velocity, to calculate a propagation distance difference of the signals from the node to the base stations, which is expressed by the following equation:

$$\{|P-Pi|-|P-P1|\}=c(Ti-T1), i=2, \ldots, n,$$

to thereby calculate a position of the node (for example, refer to Atsushi Ogino and five others, "Wireless LAN Access System (1) Study of Position Detecting System", 2003. General Assembly Lecture Thesis Collection, The Institute of Electronics, Information and Communication Engineers, B-5-203, p. 662).

Also, there has been proposed a hyperbolic method of calculating a position of a node by using a hyperbolic curve (for example, refer to JP 2003-189353 A).

SUMMARY OF THE INVENTION

In the method in which the signal from the satellite such as a GPS is used, a special receiver or antenna is necessary, making it difficult to miniaturize the node and to achieve low power consumption. This method can only be used outdoors to receive a radio wave from the satellite. Thus, if the node is used indoors, there is a method of disposing receiving stations at several places to receive radio waves from the node and approximating a position of a receiving station, which can receive a signal, to a position of the node. According to this method, however, since position measuring accuracy depends on a distribution density of the receiving stations, many receiving stations must be distributed to measure an accurate position of the node.

Additionally, in the method of causing the node to receive the signals sent from the plurality of base stations and calculating the position of the node based on the reception timing difference, clocks of the base stations must be synchronized with one another before the sending of the signals. Accordingly, it is impossible to measure a position of a node at the moment when the node detects an abnormality. Besides, the node needs to have a receiver, making it difficult to miniaturize the node and to achieve lower power consumption.

According to the above-mentioned conventional technology, a receiver must be additionally installed at the base station to receive a positioning signal. Moreover, the node must generate the positioning signal.

In order to achieve the above object, an embodiment of this invention provides a node position measuring system includes a node, a reference station, a plurality of base stations, a server that calculates a position of the node, and a network that interconnects the base stations and the server. The reference station includes a positioning signal reception module that receives the positioning signal, and a reference signal generation module that transmits a reference signal after the positioning signal reception module receives the positioning signal. Each of the base stations includes a signal reception module that receives the positioning signal and the reference signal, a reception time measuring module that detects specific patterns from the positioning signal and the reference signal received by the signal reception module to measure a detection time, and a communication module that transmits time information, which is generated from the time measured by the reception time measuring module, to the server. The server includes a position calculation module that calculates the position of the node based on the time information transmitted from the base station.

According to the embodiment of this invention, a configuration of the base station can be simplified as it is not necessary to additionally install a receiver therein to receive a positioning signal.

BRIEF DESCRIPTION OF THE DRAWINGS

The present invention can be appreciated by the description which follows in conjunction with the following figures, wherein.

DESCRIPTION OF THE PREFERRED EMBODIMENTS

Hereinafter, the preferred embodiments of this invention will be described with reference to the accompanying drawings.

First Embodiment

Figure 1:
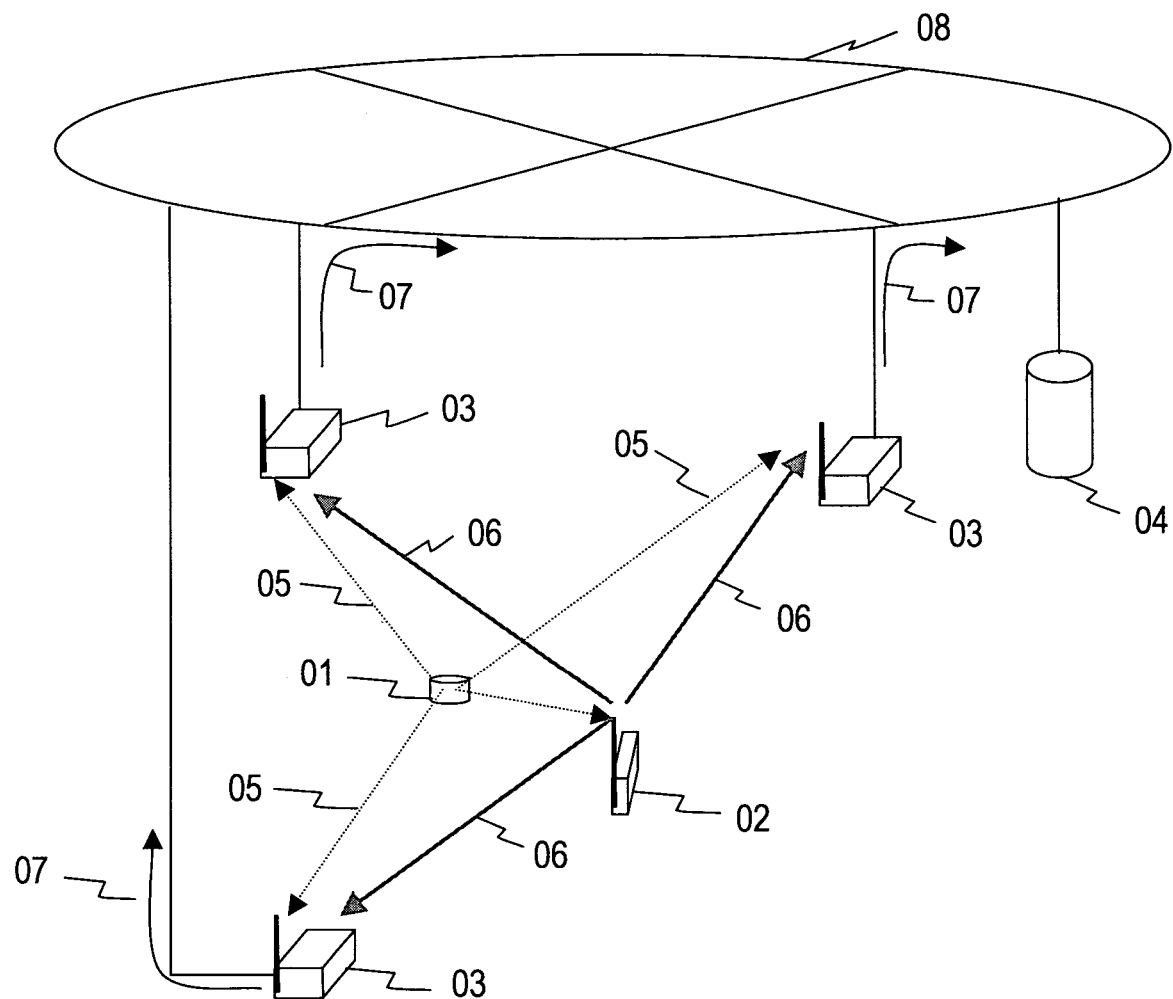
FIG. 1 is a block diagram showing a configuration of a positioning system according to a first embodiment of this invention.

FIG. 1 is a block diagram showing a configuration of a positioning system according to a first embodiment of this invention.

The positioning system includes a node 01, a reference station 02, an access point (AP) 03, and a server 04.

The node 01 transmits a radio packet (positioning signal) 05 for measuring a position. The reference station 02 receives the positioning signal 05 from the node 01, and then transmits a radio packet (reference signal) 06 to establish a reference time. The access point 03 receives the positioning signal 05 transmitted from the node 01 and the reference signal 06 transmitted from the reference station 02, and measures the times at which specific bit patterns of the received positioning signal 05 and of the received reference signals 06 are detected. The access point 03 transmits reception timing information 07 containing the measured times of detection of the specific bit patterns to the server 04 through a network 08. The network 08 may be wired or radio.

The server 04 is provided with a system information database (not shown) which contains information on a position of each access point 03. The server 04 is connected to each access point 04 through the network 08. The server 04 calculates a position of the node 01 by using the reception timing information 07 received from each access point 03 and the information contained in the system information database.

The positioning system of the embodiment is suitably implemented by applying a pulse mode of an ultra wideband (UWB) to communication or CDMA mode.

Figure 2:
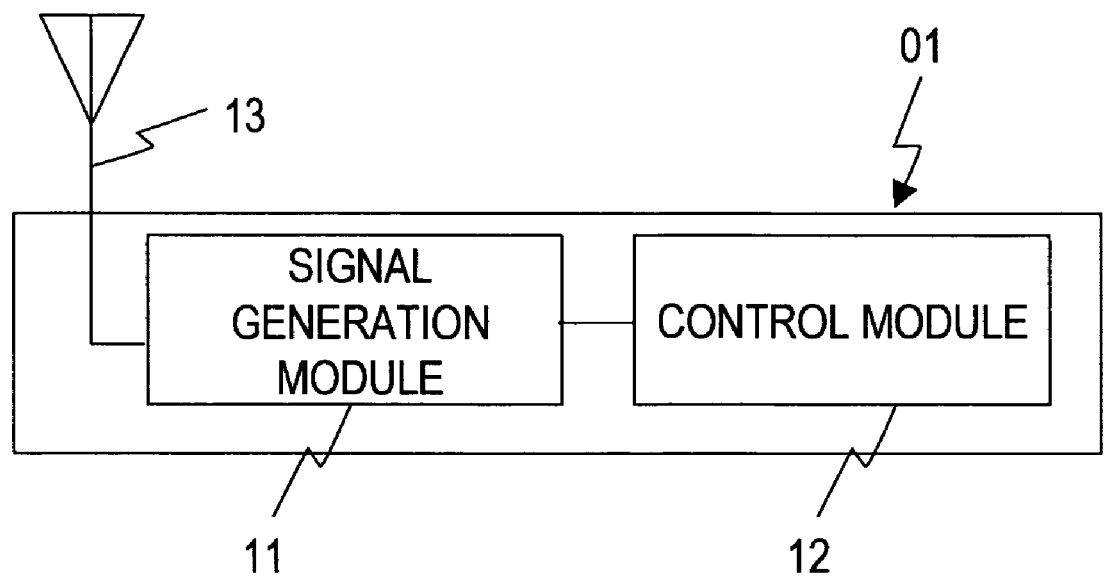
FIG. 2 is a block diagram showing a configuration of a node according to the first embodiment of this invention.

FIG. 2 is a block diagram showing a configuration of the node 01 according to the first embodiment of this invention.

The node 01 includes a signal generation module 11, a control module 12, and an antenna 13.

The control module 12 decides a time at which the node 01 transmits the positioning signal 05 based on information or the like from a sensor (e.g., sensor for detecting an abnormality of a surrounding situation of the node) or a timer (not shown), which are incorporated in or connected to the node 01. The control module 12 decides the time at which the node 01 transmits the positioning signal 05 even when, for example, transmission of the positioning signal 05 is requested from the access point 03.

Upon reception of an instruction from the control module 12, the signal generation module 11 generates the positioning signal 05, and transmits the positioning signal 05 through the antenna 13. As a header portion of the positioning signal 05 stores an identifier uniquely assigned to each node 01, a node that has transmitted the positioning signal 05 can be identified.

The node 01 may transmit the information obtained from the sensor or the like to the access point 03 by radio communication.

Figure 3:
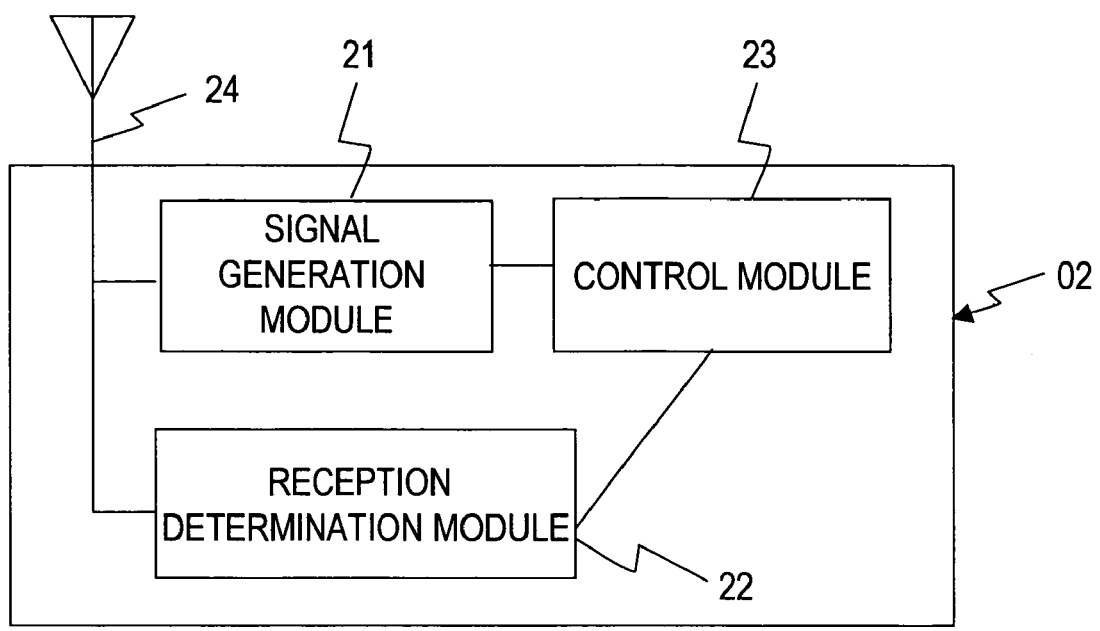
FIG. 3 is a block diagram showing a configuration of a reference station according to the first embodiment of this invention.

FIG. 3 is a block diagram showing a configuration of the reference station 02 according to the first embodiment of this invention.

The reference station 02 includes a signal generation module 21, a reception determination module 22, a control module 23, and an antenna 24.

The reception determination module 22 decodes a signal received through the antenna 24 to determine whether the received signal is a positioning signal 05 or not. When the received signal is the positioning signal 05, the reception determination module 22 determines the node 01 that has transmitted the positioning signal 05.

Upon reception of the positioning signal 05 through the antenna 24, the control module 23 decides contents and a transmission time of a reference signal 06 to be generated by the signal generation module 21 to instruct the signal generation module 21 to generate the same. The control module 23 may instruct the signal generation module 21 to generate a signal only when the positioning signal 05 received through the antenna 24 has been transmitted from the specific node 01.

The signal generation module 21 receives the instruction from the control module 23 to generate a reference signal 06, and transmits the reference signal 06 through the antenna 24.

Figure 4:
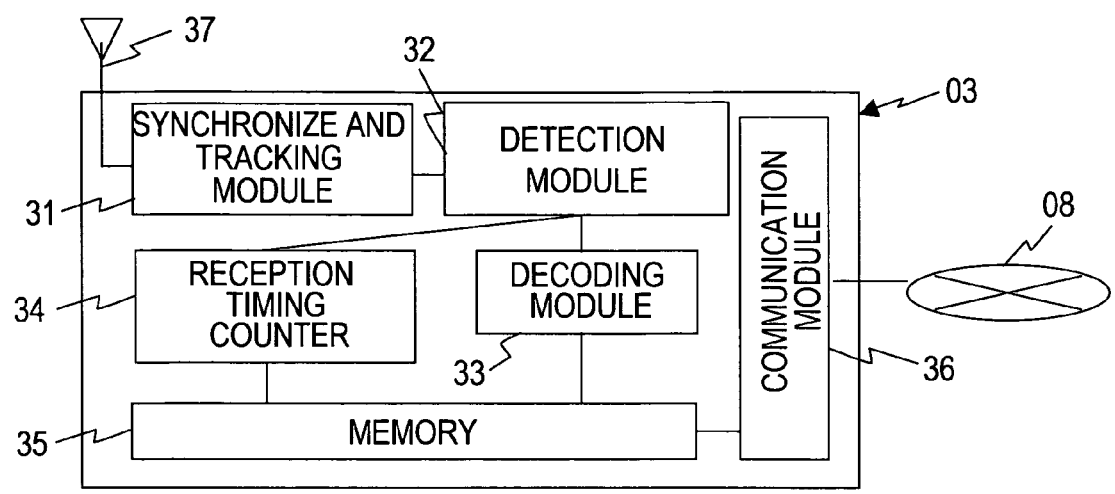
FIG. 4 is a block diagram showing a configuration of an access point according to the first embodiment of this invention.

FIG. 4 is a block diagram showing a configuration of the access point 03 according to the first embodiment of this invention.

The access point 03 includes a synchronize and tracking module 31, a detection module 32, a decoding module 33, a reception timing counter 34, a memory 35, a communication module 36, and an antenna 37.

The synchronize and tracking module 31 synchronizes an operation clock of the access point 03 with the positioning signal 05 transmitted from the node 01 and the reference signal 06 transmitted from the reference station 02. The detection module 32 reads bit strings from the positioning signal 05 and the reference signal 06 synchronized by the synchronize and tracking module 31. The decoding module 33 decodes the bit strings read by the detection module 32.

As will be described below in detail with reference to FIG. 5, the reception timing counter 34 measure a time T1 of reception of the positioning signal 05 transmitted from the node 01 and a time T2 of reception of the reference signal 06 transmitted from the reference station 02.

The memory 35 stores reception timing information 07. The reception timing information 07 contains information decoded by the decoding module 33 and the reception times T1 and T2 measured by the reception timing counter 34.

The communication module 36 transmits the reception timing information 07 to the server 04 through the network 08.

Before transmitting the reception timing information, the communication module 36 compares the positioning signal reception time T1 with the reference signal reception time T2. In the case of time T1>time T2, the communication module 36 determines that the reception timing counter 34 has been returned to an initial value during the period from the time T1 to the time T2. Then, the communication module 36 calculates a time T2' (=T2+Tmax) which is a result of adding a maximum value Tmax of the reception timing counter 34 to the time T2. Subsequently, the communication module 36 transmits the calculated time T2' in place of the reference signal reception time T2.

As described above, a configuration of the access point 03 can be simplified as the access point 03 of the embodiment includes only the reception timing counter 34 in a normal radio communication device.

Next, an example of the access point 03 to which an impulse mode for performing communication by using an impulse signal is applied will be described.

The synchronize and tracking module 31 includes a matched filter and a timing controller. The timing controller adjusts a phase of a pulse string of an input signal to maximize an output of the matched filter.

The detection module 32 includes a demodulation module and a pattern detection module. The demodulation module converts the output of the matched filter into a bit string. The pattern detection module detects a specific bit pattern from the bit string converted by the demodulation module. Upon detection of the specific bit pattern, the pattern detection module transmits a pattern detection signal to the reception timing counter 34. Further, when the specific bit pattern is a start-of-frame delimiter (SFD), the pattern detection module transmits a bit string after the SFD to the decoding module 33. The decoding module 33 decodes the bit string received from the pattern detection module to read the contents of the pattern.

Figure 5:
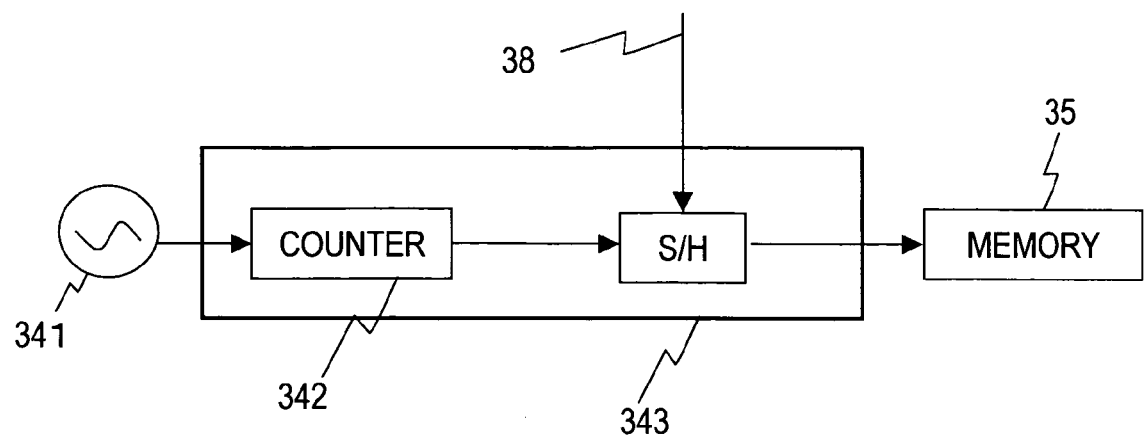
FIG. 5 is a block diagram showing a configuration of the reception timing counter provided in the access point according to the first embodiment of this invention.

FIG. 5 is a block diagram showing a configuration of the reception timing counter 34 provided in the access point 03 according to the first embodiment of this invention.

The reception timing counter 34 includes a counter 342 and a sample holding module 343.

The counter 342 operates upon reception of a fast clock 341, and counts a time. The counter 342 may operate constantly or when necessary. In the case of its constant operation, the counter 342 automatically returns to an initial value when a fixed value is reached. On the other hand, in the case of the operation performed when necessary, the counter 342 starts its operation upon reception of a preamble of the positioning signal 05, and returns to the initial value upon detection of the specific bit pattern of the reference signal 06.

The clock 341 is preferably faster than an operation clock of the access point 03. The clock 341 may be a fast clock dedicated to the reception timing counter 34, or made fast by frequency-dividing the operation clock of the access point 03.

Upon reception of a pattern detection signal 38 from the detection module 32, the sample holding module 343 holds a value of the counter 342 at the time of reception.

Figure 6:
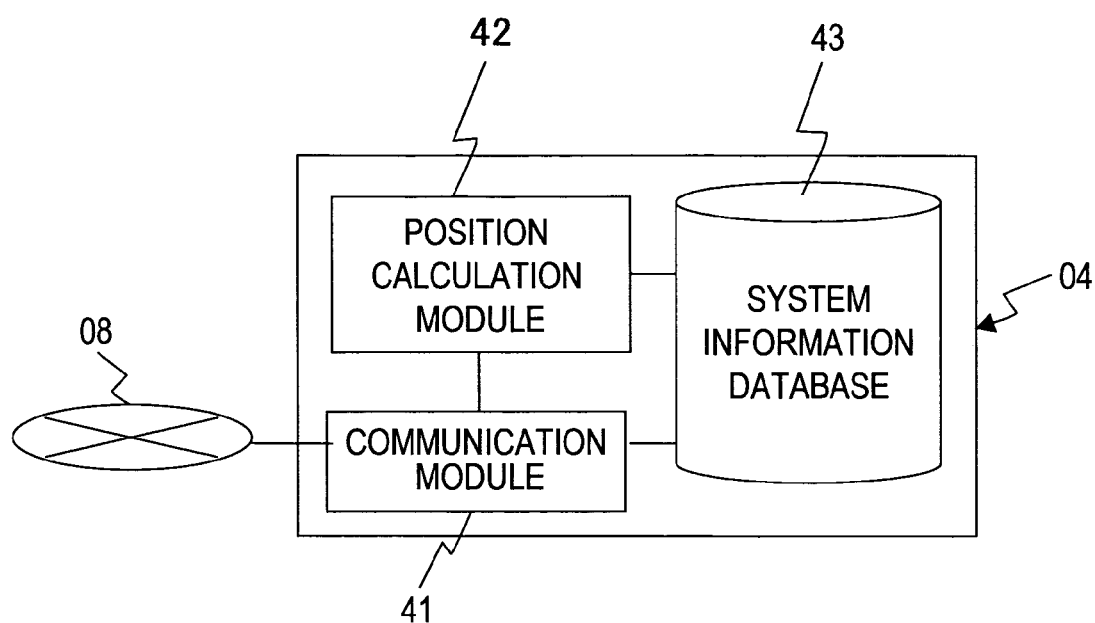
FIG. 6 is a block diagram showing a configuration of the server according to the first embodiment of this invention.

FIG. 6 is a block diagram showing a configuration of the server 04 according to the first embodiment of this invention.

The server 04 includes a communication module 41, a position calculation module 42, and a system information database 43.

The communication module 41 functions as an interface for connecting to the network 08. Upon reception of the reception timing information 07 from the access point 03, the communication module 41 transfers the reception timing information 07 to the position calculation module 42.

The system information database 43 stores positions of each access point 03 and the reference station 02. The system information database 43 may store a distance from the reference station 02 to each access point 03 in place of the position of the reference station 02, or a propagation time of the reference signal 06 from the reference station 02 to each access point 03.

The position calculation module 42 calculates a position of the node 01 based on the reception timing information 07 from the communication section 41 and the information from the system information database 43.

Figure 7:
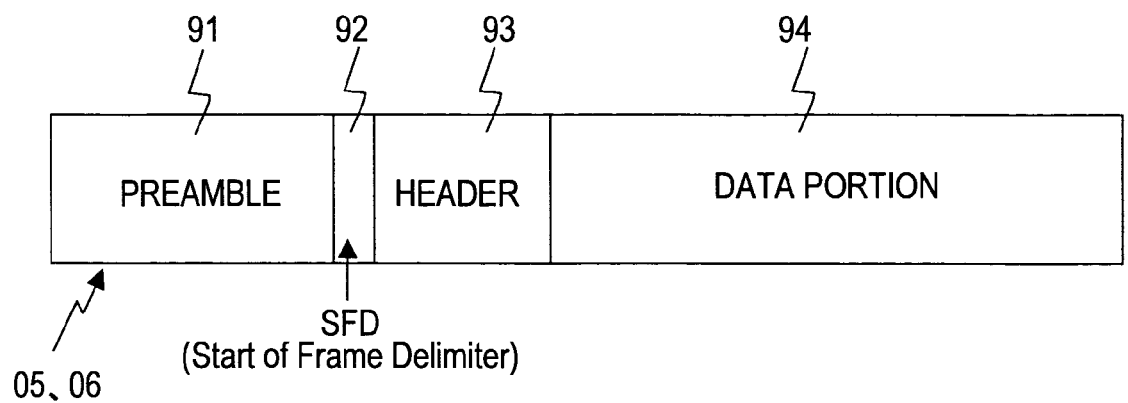
FIG. 7 is a block diagram showing a structure of each of the positioning signal transmitted from the node and the reference signal transmitted from the reference station according to the first embodiment of this invention.

FIG. 7 is a block diagram showing a structure of each of the positioning signal 05 transmitted from the node 01 and the reference signal 06 transmitted from the reference station 02 according to the first embodiment of this invention.

Each of the positioning signal 05 and the reference signal 06 is a radio packet which includes a preamble 91, an SFD 92, a header 93, and a data portion 94.

The preamble 91 is used for timing synchronization at a device which has received the positioning signal 05 and the reference signal 06. The SFD 92 indicates an end of the preamble 91, and is used as a specific bit pattern defining a reception time according to the embodiment.

The header 93 stores information on identifiers of transmission and reception sides of the positioning signal 05 and the reference signal 06 or the like. The identifier of the transmission side contained in the header 93 may be used as a specific bit pattern defining a reception time in place of the SFD 92. For example, by setting an identifier of the node 01 to be measured for position as the specific bit pattern defining the reception time, the access point 03 can measure a time only for the node 01.

The data portion 94 stores necessary information of the positioning signal 05 and the reference signal 06. The data portion 94 may contain a specific bit pattern in place of using the SFD 92 as the specific bit pattern defining the reception time.

Each of the positioning signal 05 and the reference signal 06 can be structured by setting, e.g., the preamble 91 as "168 bits", the SFD 92 as "8 bits", the header 93 as "48 bits", and the data portion 94 as "200 bits".

Figure 8:
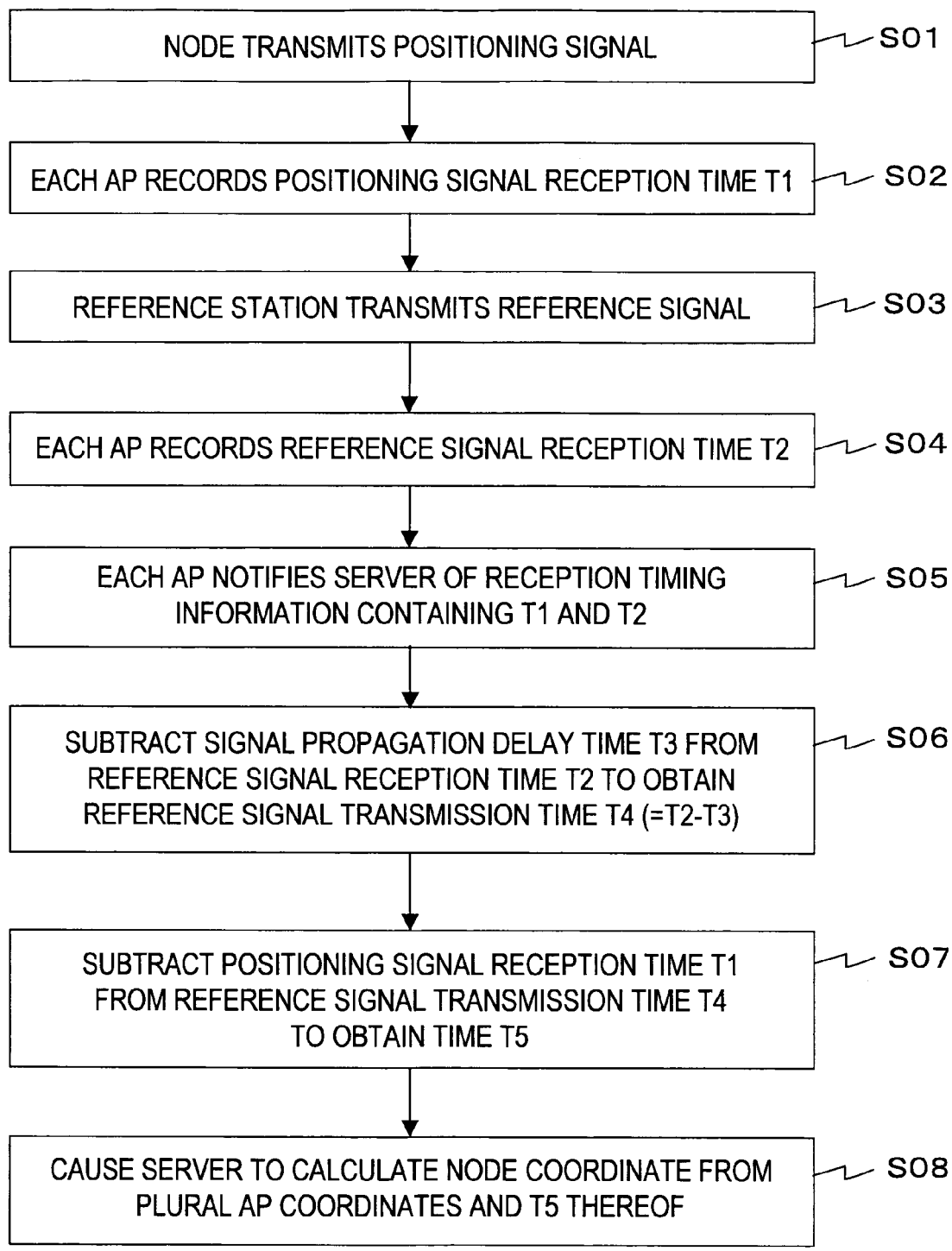
FIG. 8 is a flowchart showing a position measuring process of the node in the positioning system according to the first embodiment of this invention.

FIG. 8 is a flowchart showing a position measuring process of the node 01 in the positioning system according to the first embodiment of this invention.

First, the node 01 transmits a positioning signal 05 (S01).

The access point 03 synchronizes reception timing by using the preamble 91 of the positioning signal 05 transmitted from the node 01 and receives the positioning signal 05. The access point 03 records a time of detection of a specific bit pattern contained in the received positioning signal 05 as a positioning signal reception time T1 (S02).

On the other hand, the reference station 02 monitors the positioning signal 05 transmitted from the node 01 in a normal state, and stands ready to receive the positioning signal 05. Upon reception of the positioning signal 05 transmitted from the node 01, the reference station 02 transmits a reference signal 06 to the access point 03 (S03).

The reference station 02 may transmit the reference signal 06 to the access point 03 after a lapse of predetermined time from the reception of the positioning signal 05. Accordingly, it is possible to prevent overlapping of the reference signal 06 transmitted from the reference station 02 and reflected waves of the positioning signal 05 transmitted from the node 01.

Next, the access point 03 synchronizes reception timing by using the preamble 91 of the reference signal 06 transmitted from the reference station 02, and receives the reference signal 06. The access point 03 records a time of detection of a specific bit pattern contained in the received reference signal 06 as a reference signal reception time T2 (S04).

Next, each access point 03 transmits reception timing information 07 to the server 04 (S05). The reception timing information 07 contains, for example, the positioning signal reception time T1, the reference signal reception time T2, an identifier of the access point 03, and an identifier of the reference station 02 which has transmitted the reference signal 06.

Upon reception of the reception timing information 07 from the access point 03, the server 04 extracts a position of the access point 03 which has transmitted the reception timing information 07 from the system information database 43. Then, the server 04 obtains a distance between the access point 03 and the reference station 02 based on the extracted position of the access point 03. The server 04 divides the obtained distance by a light velocity to calculate a signal propagation delay time T3 from the reference station 02 to the access point 03. Subsequently, the server 04 subtracts the time T3 from the time T2 to obtain a time T4 (=T2−T3) (S06). The time T4 precedes the reference signal reception time T2 by the signal propagation delay time T3. Thus, it is a time at which the reference station 02 transmits the reference signal 06.

Next, the server 04 subtracts the positioning signal reception time T1 from the reference signal transmission time T4 to obtain a time T5 (=T4−T1) (S07).

Then, the server 04 uses the obtained time T5 and the position of the access point 03 to calculate a position of the node 01 (S08).

As a method of calculating the position of the server 01, a hyperbolic method is used (refer to JP 2003-189353 A for details). According to the hyperbolic method, a difference between a distance from a positioning target node 01 to an access point 03 and a distance from the positioning target node 01 to another access point 03 is calculated based on a difference in times of reception of the positioning signal 05 by the two access points 03. Next, a position of the positioning target node 01 is specified from an intersection point of at least two hyperbolic curves drawn by connecting points of satisfying conditions of the calculated difference of the distance.

A hyperbolic method may also be used which executes weighting based on reception intensities of the positioning signal 05 and the reference signal 06 received by the access point 03 when the position is calculated by using the difference between the reference signal transmission time T4 and the positioning signal reception time T1. Specifically, according to the hyperbolic method that executes weighting, when positioning signal reception times T1 are measured at three or more access points 03 to obtain three or more hyperbolic curves, a weight coefficient is given to coordinates of an intersection point of each hyperbolic curve based on the reception intensities of the positioning signal 05 and the reference signal 06 used for creating the hyperbolic curve passing through the intersection point, and the coordinates of the intersection points of the hyperbolic curves are weighted and averaged to thereby specify the position of the positioning target node 01.

Figure 9:
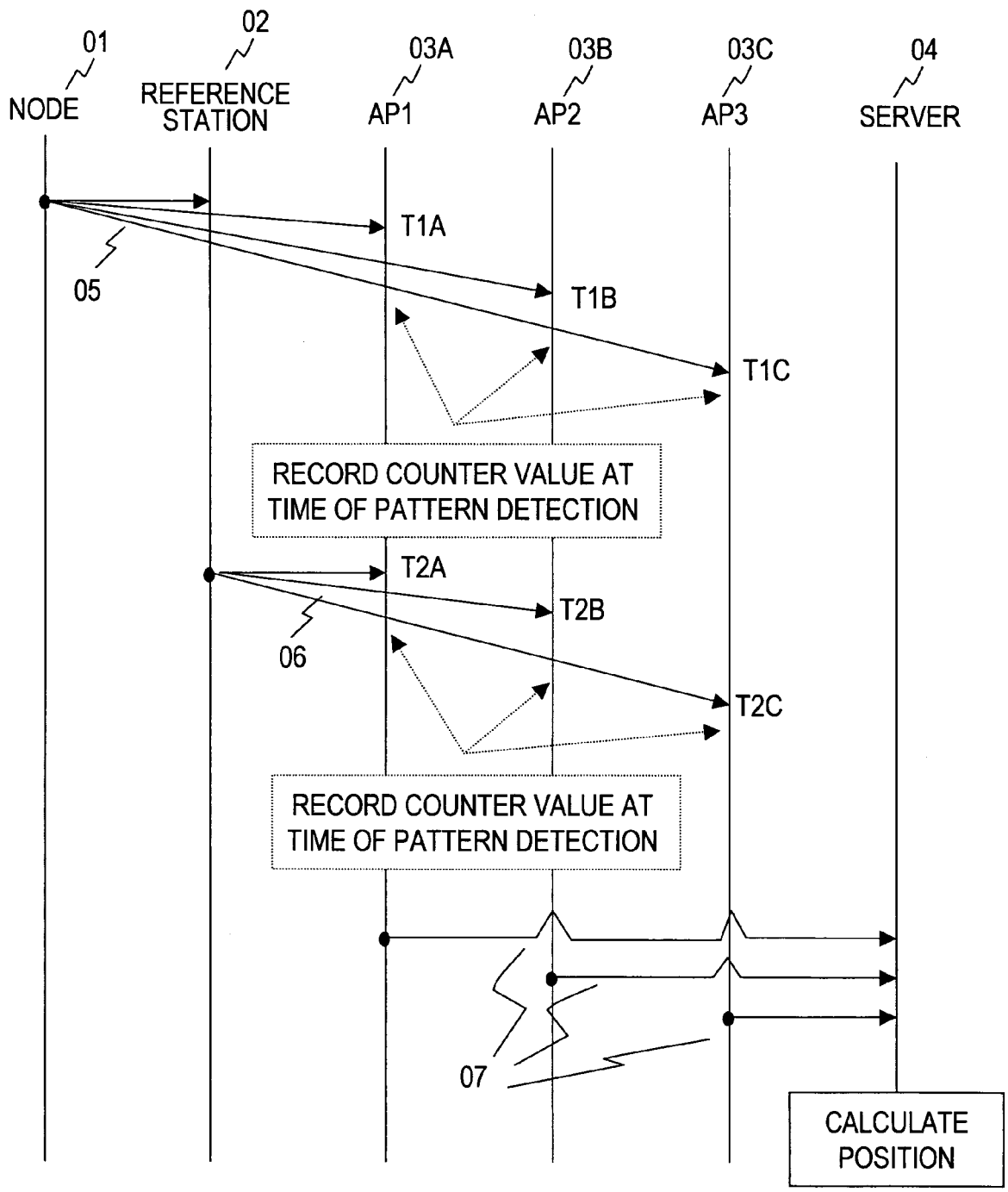
FIG. 9 is a sequential diagram showing signal transmission/reception in the positioning system according to the first embodiment of this invention.

FIG. 9 is a sequential diagram showing signal transmission/reception in the positioning system according to the first embodiment of this invention.

The node 01 transmits a positioning signal 05 to surrounding access points 03A, 03B, and 03C and to the reference station 02 at an optional time at which position calculation is desired to be performed (e.g., periodically or when the sensor disposed in the node detects an abnormality).

Each access point 03A or the like receives the positioning signal 05 from the node 01. Each access point 03A or the like stores a value of the reception timing counter 34 at the time of detection of a specific bit pattern contained in the positioning signal 05 as a positioning signal reception time T1$x$.

On the other hand, upon reception of the positioning signal 05 from the node 01, the reference station 02 transmits a reference signal 06 to the surrounding access point 03A or the like.

Each access point 03A or the like receives the reference signal 06 from the reference station 02. Each access point 03A or the like stores a value of the reception timing counter 34 at the time of detection of a specific bit pattern contained in the reference signal 06 as a reference signal reception time T2$x$.

Each access point 03A or the like transmits reception timing information 07 containing the positioning signal reception time T1$x$, the reference signal reception time T2$x$, and an identifier of its own to the server 04 through the network 08.

The server 04 calculates a position of the node 01 based on the reception timing information 07 transmitted from the access point 03A or the like and the information stored in the system information database 43.

According to the first embodiment of this invention, the position of the node 01 can be measured even when the node 01 does not have a reception function. Thus, the node 01 can be simplified in configuration to be miniaturized.

The position of the node 01 can be measured upon just one-time transmission of the positioning signal 05 from the node 01. Accordingly, power consumption of the node 01 can be reduced.

As the positioning signal 05 is a radio packet, the position of the node 01 can be measured upon transmission of normal data from the node 01. In other words, the position of the node 01 can be measured without requiring the node 01 to transmit a signal only for requesting position measurement.

It is not necessary to synchronize the time of each access point 03 before the position measurement of the node 01. Thus, the position of the node 01 can be measured at timing desired by the node 01 (e.g., the moment at which the node 01 detects an abnormality).

Furthermore, the access point 03 does not need to include a receiver used for receiving signals for positioning in addition to a receiver used for normal radio communication. In other words, the reception timing counter 34 alone is provided in the normal radio communication device. As a result, the access point 03 can be simplified in configuration, which makes it possible to miniaturize the access point 03 and to reduce costs.

Second Embodiment

According to the second embodiment of this invention, an access point for transmitting a reference signal 06 is used.

Figure 10:
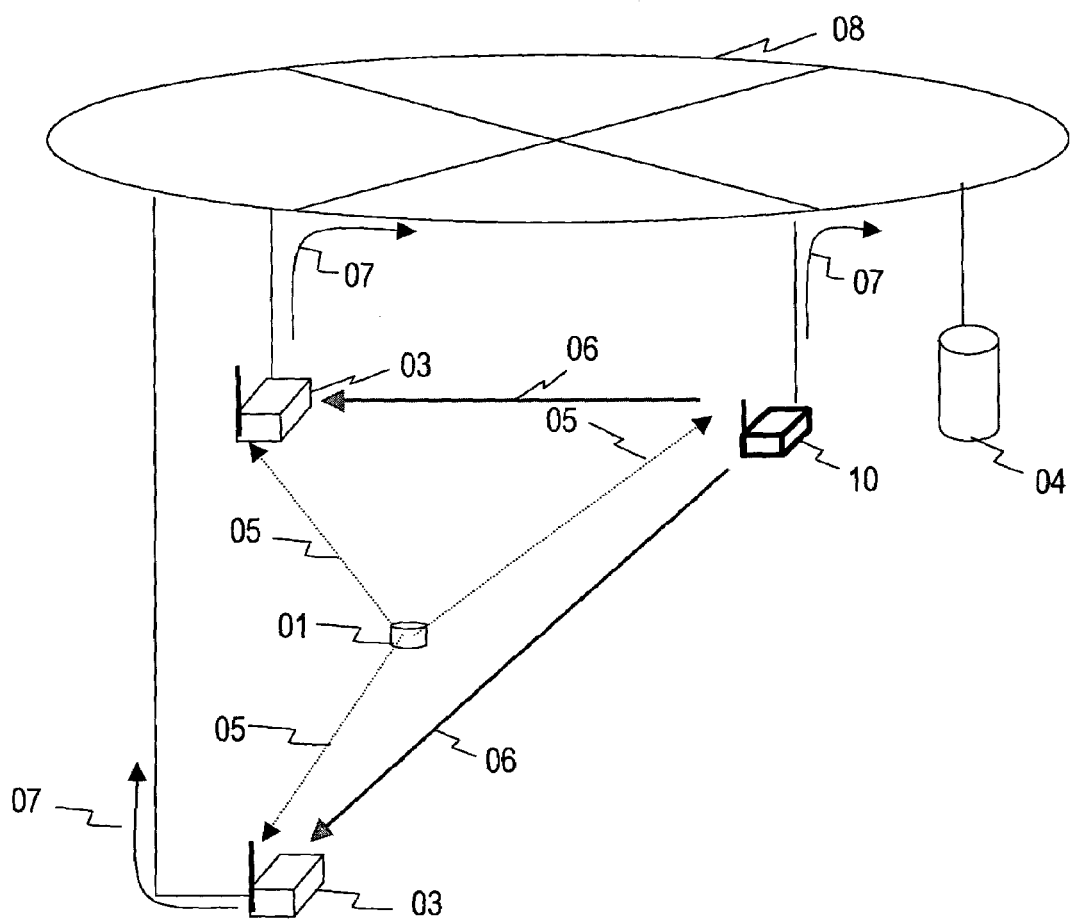
FIG. 10 is a block diagram showing a configuration of a positioning system according to a second embodiment of this invention.

FIG. 10 is a block diagram showing a configuration of a positioning system according to the second embodiment of this invention.

The positioning system of the second embodiment is similar to that of the first embodiment shown in FIG. 1 except that the second embodiment includes an access point 10 in place of a reference station 02. Similar components are denoted by similar reference numerals, and description thereof will be omitted.

The access point 10 receives a positioning signal 05 from the node 01, transmits a reference signal 06 after the reception of the positioning signal 05 from the node 01, and measures a time of detection of a specific bit pattern of the received positioning signal 05 by a counter.

Figure 11:
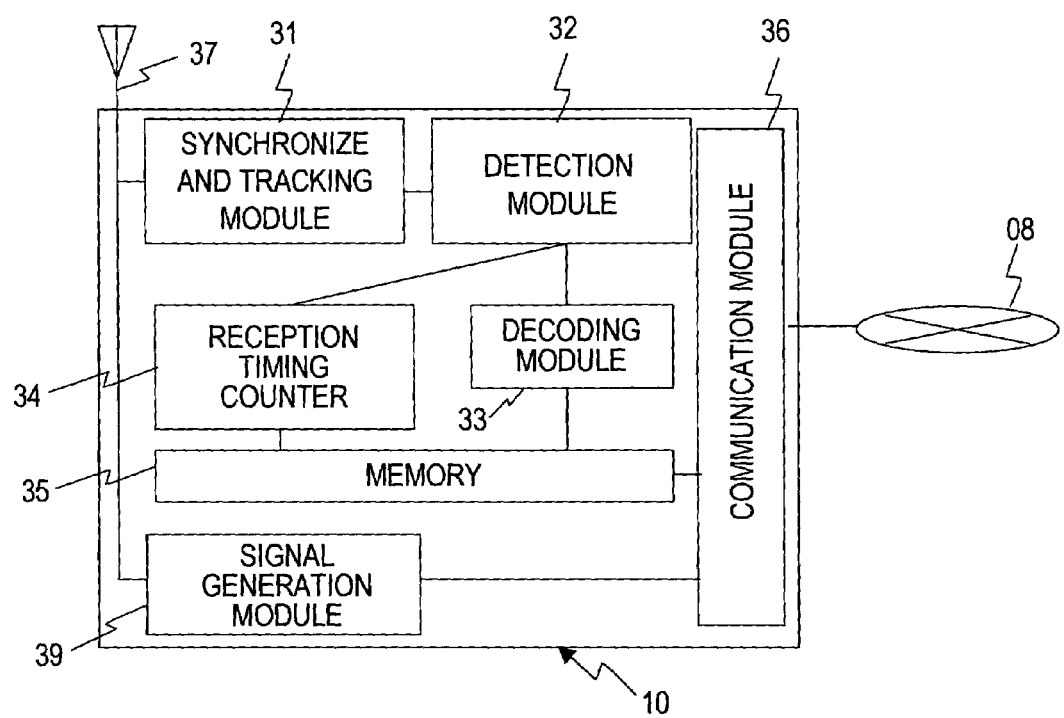
FIG. 11 is a block diagram showing a configuration of the access point for transmitting the reference signal according to the second embodiment of this invention.

FIG. 11 is a block diagram showing a configuration of the access point 10 for transmitting the reference signal 06 according to the second embodiment of this invention.

The access point 10 is similar to the access point 03 except that the access point 10 includes a signal generation module 39. Similar components are denoted by similar reference numerals, and description thereof will be omitted.

A communication module 36 determines whether a signal decoded by a decoding module 33 is a positioning signal 05 or not. When it is a positioning signal 05, the communication module 36 decides contents and a transmission time of a reference signal 06 to be generated by the signal generation module 39 to instruct the signal generation module 39 to generate the same.

Upon reception of the instruction from the communication module 36, the signal generation module 39 generates a reference signal 06 to transmit the reference signal 06 through an antenna 37.

Figure 12:
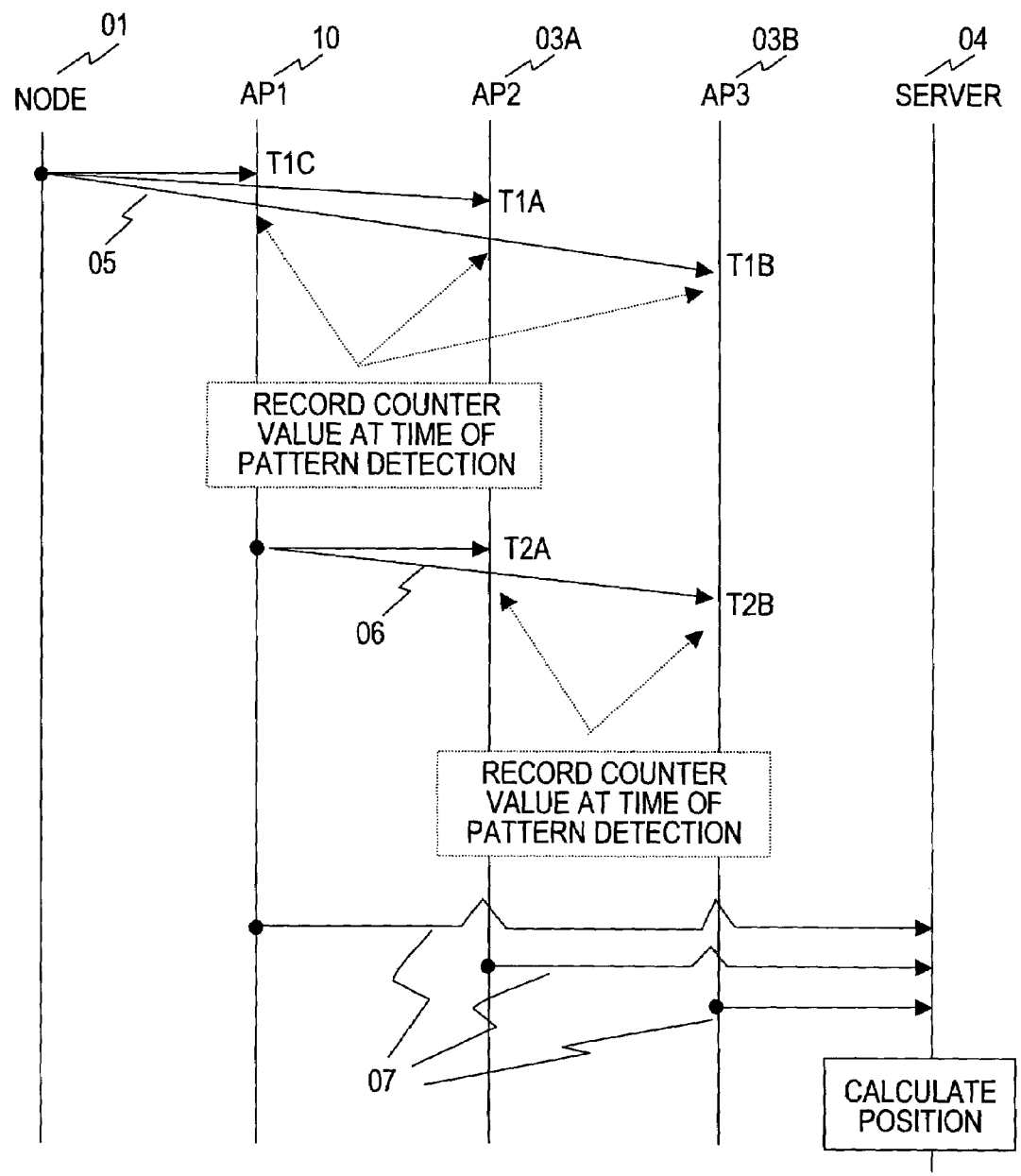
FIG. 12 is a sequential diagram showing signal transmission/reception in the positioning system according to the second embodiment of this invention.

FIG. 12 is a sequential diagram showing signal transmission/reception in the positioning system according to the second embodiment of this invention.

The node 01 transmits a positioning signal 05 to surrounding access points 03A, 03B, and 10 at an optional time at which position calculation is desired to be performed.

Each of the access points 03A, 03B, and 10 receives the positioning signal 05 from the node 01. Each of the access points 03A, 03B, and 10 stores a value of the reception timing counter 34 at the time of detecting a specific bit pattern contained in the positioning signal 05 as a positioning signal reception time T1x. Further, the access point 10 transmits a reference signal 06 to the surrounding access points 03A and 03B.

Each of the access points 03A and 03B receives the reference signal 06 from the access point 10. Each of the access points 03A and 03B stores a value of the reception timing counter 34 at the time of detection of a specific bit pattern contained in the reference signal 06 as a reference signal reception time T2x.

The access point 10 transmits reception timing information 07 containing the positioning signal reception time T1x, the reference signal transmission time T4, and an identifier of the access point 10 to a server 04 through a network 08. Similarly, each of the access points 03A and 03B transmits the reception timing information 07 containing the positioning signal reception time T1x, the reference signal reception time T2x, and an identifier of each of the access points 03A and 03B to the server 4 through the network 08.

The server 04 calculates a position of the node 01 based on the reception timing information 07 transmitted from each of the access points 03A, 03B, and 10 and on information stored in a system information database 43.

A positioning system that uses a normal packet transmitted from the node 01 as a positioning signal 05 is also included by this invention. In this case, upon reception of the packet, a reference station 02 or an access point 10 decides whether or not to measure a position of the node 01 which has transmitted the packet. Then, the reference station 02 or the access point 10 transmits a reference signal 06 only when the position of the node 01 is decided to be measured.

As an example, a case where the positioning system includes nodes A and B and only a position of the node B is desired to be measured at the reference station will be described. In this case, the reference station does not respond even when the reference station receives a packet for fixed time communication from the node A, and transmits a reference signal 06 only when the reference station receives a packet for fixed time communication from the node B. Then, the access point transmits the reception timing information 07 with respect to the node B to the server.

According to the second embodiment of this invention, in addition to the effects of the first embodiment, costs of a system configuration can be reduced as it is not necessary to dispose a reference station 02 separately from the access point.

This invention can be used for a wireless LAN system which calculates a position of a node, especially for a node position calculation system where power consumption is reduced by a simple configuration.

For example, this invention can be used for a hydrogen leakage alarm system of a hydrogen station which supplies a hydrogen gas to a fuel-cell vehicle. According to this system, a node including a hydrogen sensor (sensor node) is distributed in an optional place, or carried by an operator, to detect hydrogen leakage. The sensor node sends a positioning signal immediately upon detection of a hydrogen gas, and a surrounding access point measures its reception timing. Next, a reference station that has received the positioning signal from the sensor node sends a reference signal, and its reception timing is similarly measured at each access point. Each access point sends a reception timing notification including results of the measurements to a server connected through a wired network. The server calculates an abnormality detecting position of the sensor node, based on the reception timing notification, coordinates information of each access point, and a distance from each access point to the reference station.

According to the hydrogen leakage alarm system, even when the position of the sensor node is changed as needed, it is not necessary to update system information as long as the position of the access point is not changed. Since positioning can be performed without a signal reception function in the sensor node, a portable carrying method involving miniaturizing the sensor node and incorporating the sensor node in, e.g., a nametag of the operator can be realized. Since the access points need not be synchronized in time before the positioning, it is possible to obtain a position of the sensor node at the moment when the hydrogen sensor detects an abnormality. Moreover, since a position of the operator is not traced until the sensor detects an abnormality, it is possible to secure privacy of the operator.

While the present invention has been described in detail and pictorially in the accompanying drawings, the present invention is not limited to such detail but covers various obvious modifications and equivalent arrangements, which fall within the purview of the appended claims.

What is claimed is:

1. A node position measuring system, comprising:
 a node that transmits a positioning signal;
 a reference station that transmits a reference signal;

a plurality of base stations that receive the positioning signal and the reference signal;
a server that calculates a position of the node; and
a network that interconnects the base stations and the server, wherein:
the reference station comprises:
a positioning signal reception module that receives the positioning signal; and
a reference signal generation module that transmits the reference signal after the positioning signal reception module receives the positioning signal;
each of the base stations comprises:
a signal reception module that receives the positioning signal and the reference signal;
a reception time measuring module that detects specific patterns from the positioning signal and the reference signal received by the signal reception module to measure a detection time; and
a communication module that transmits time information to the server, the time information being generated from the detection time measured by the reception time measuring module; and
the server comprises a position calculation module that calculates the position of the node based on the time information transmitted from the base station.

2. The node position measuring system according to claim 1, wherein the reference station comprises:
a reception time measuring module that detects the specific pattern from the positioning signal received by the positioning signal reception module to measure a detection time; and
a communication module that transmits the time information to the server, the time information being generated from the detection time measured by the reception time measuring module.

3. The node position measuring system according to claim 1, wherein a UWB signal is used as the positioning signal and the reference signal.

4. The node position measuring system according to claim 1, wherein the specific pattern detected by the reception time measuring module indicates an end of a preamble contained in the positioning signal.

5. The node position measuring system according to claim 1, wherein:
the signal reception module receives the positioning signal containing data transmitted from the node to the base station; and
the reception time measuring module comprises:
a detection module that detects the specific patterns from the positioning signal and the reference signal received by the signal reception module; and
a counter module that measures a time when the detection module detects the specific patterns.

6. A radio base station in node position measuring system for measuring a position of a node that transmits a positioning signal, comprising:
a signal reception module that receives the positioning signal from the node and a reference signal transmitted from a reference station receiving the positioning signal;
a reception time measuring module that detects specific patterns from the positioning signal and the reference signal received by the signal reception module to measure a detection time; and
a communication module that transmits time information to a position calculation module, the time information being generated from the detection time measured by the reception time measuring module, the position calculation module calculating a position of the node based on the time information.

7. The radio base station according to claim 6, further comprising a reception signal generation module that transmits the reference signal after the signal reception module receives the positioning signal.

8. The radio base station according to claim 6, wherein a UWB signal is used as the positioning signal and the reference signal.

9. The radio base station according to claim 6, wherein the specific pattern detected by the reception time measuring module indicates an end of a preamble contained in the positioning signal.

10. The radio base station according to claim 6, wherein:
the signal reception module receives the positioning signal containing data transmitted from the node to the base station; and
the reception time measuring module comprises:
a detection module that detects the specific patterns from the positioning signal and the reference signal received by the signal reception module; and
a counter module that measures a time when the detection module detects the specific patterns.

11. A position measuring method of measuring a position of a node by using a node position measuring system, the measuring system comprising a node that transmits a positioning signal, a reference station that transmits a reference signal, base stations that receive the positioning signal and the reference signal, a server that calculates the position of the node, and a network that interconnects the base stations and the server,
the position measuring method comprising:
receiving the positioning signal at the reference station:
transmitting the reference signal from the reference station after the reception of the positioning signal;
receiving the positioning signal and the reference signal at each of the base stations;
detecting specific patterns from the received positioning signal and the reference signal at the base station;
measuring a time of detecting the specific patterns at the base station;
transmitting time information from the base station to the server, the time information being generated from the measured time; and
calculating the position of the node at the server based on the time information transmitted from the base station.

12. The position measuring method according to claim 11, further comprising:
detecting the specific pattern from the positioning signal at the reference station;
measuring the time of detecting the specific pattern at the reference station; and
transmitting the time information from the reference station to the server, the time information being generated from the measured time.

13. The position measuring method according to claim 11, wherein a UWB signal is used as the positioning signal and the reference signal.

14. The position measuring method according to claim 11, wherein the specific pattern indicates an end of a preamble contained in the positioning signal.

* * * * *